March 30, 1954  A. P. FITZ JOHN  2,673,733
IMPROVED SHOCK ABSORBING AND CUSHIONING DEVICE
Filed Oct. 31, 1950
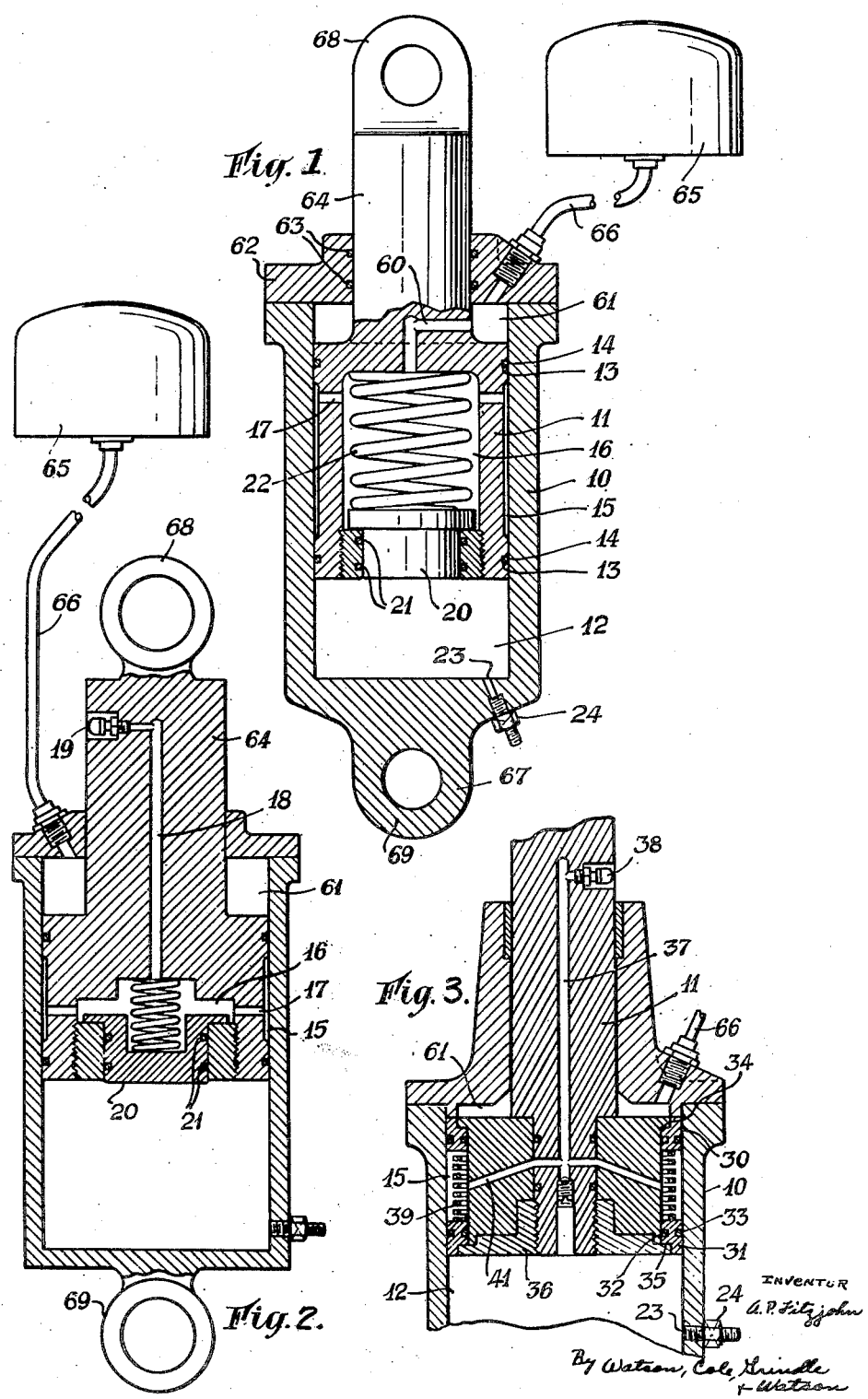

Patented Mar. 30, 1954

2,673,733

UNITED STATES PATENT OFFICE 2,673,733

IMPROVED SHOCK ABSORBING AND CUSHIONING DEVICE

Arthur Percy Fitz John, Sheffield, England, assignor of one-half to George Turton Platts & Company Limited, Wincobank, Sheffield, England, a company of Great Britain and Northern Ireland Application October 31, 1950, Serial No. 193,103

Claims priority, application Great Britain November 4, 1949

5 Claims. (Cl. 267—65)

This invention relates to shock absorbers employing a cylinder and piston assembly with fluid as the cushioning medium.

The invention has for one of its objects the provision of an efficient shock absorber in which the cylinder and piston assembly provides pressure fluid chambers in the cylinder one each at the front and rear of the piston for cushioning movement of said piston, said chambers being sealed from one another by an annular oil sealing chamber between the piston and the surrounding wall of the cylinder, the chamber at the rear of the piston communicating with a pressure fluid reservoir extraneous to the cylinder, a pressure responsive member being associated with and movable relative to the piston and being subject to pressure of fluid in the chamber at the front of the piston and to the oil in the annular oil sealing chamber, means being provided on the cylinder and the piston permitting anchoring thereof to separate bodies for relative movement of said cylinder and piston.

The annular oil sealing chamber may be formed by a circumferential recess in the piston in conjunction with the surrounding wall of the cylinder, said recess being provided between spaced mechanical sealing members accommodated in annular grooves in the piston.

Alternatively said annular chamber may be formed by spaced mechanically sealed annular members around the piston spacing said piston from the surrounding wall of the cylinder.

The pressure-responsive member may be displaceable directly against the liquid sealing medium in the annular chamber or against liquid sealing medium contained in a reservoir chamber or passages provided in the main piston and communicating with the annular chamber.

The pressure responsive member may function as an unattached component of the piston and may comprise an auxiliary piston displaceably and sealingly housed in the main piston in a chamber in the end face thereof exposed to the fluid, said chamber forming part of a reservoir containing oil sealing medium in open communication with that in the annular chamber.

The oil reservoir chamber in the main piston may be filled from a passage leading thereto from a filling orifice in the main piston accessible through the cylinder or exteriorly thereof, said orifice being provided with a non-return valve. Alternatively, the oil reservoir chamber may be filled from an external reservoir from which the oil is admitted into the cylinder behind the main piston and conveyed therefrom to the oil reservoir chamber by passages in the main piston.

A coil spring may be provided in the reservoir chamber bearing against the end thereof and the auxiliary piston.

In an alternative construction, the pressure responsive member may constitute an annular auxiliary piston displaceably and sealingly housed between the main piston and the cylinder wall said annular auxiliary piston forming, in association with a displaceable or fixed sealingly housed ring around, or integral or attached flange on, the piston or the cylinder, the mechanically sealed end walls of the annular chamber, a coil spring being located in said chamber, if desired, bearing against said end walls thereof.

Referring to the diagrammatic drawings filed herewith:

Fig. 1 is a sectional elevation of one form of shock absorber made according to this invention.

Fig. 2 is a sectional elevation of a modified form of shock absorber.

Fig. 3 is a sectional elevation of a still further modified form of shock absorber.

Referring to Fig. 1 a cylinder 10 is provided with a piston 11 reciprocable therein and adapted to compress fluid for example, air, in that section 12 of the cylinder which constitutes an air chamber at the front of the piston; that section 61 of the cylinder 10 at the rear of the piston is filled with oil to constitute an oil chamber closed by the end member 62 of the cylinder, said end member being provided with sealing rings 63 between it and the piston rod 64. The oil chamber 61 is maintained full of oil by an extraneous oil reservoir 65 and pipe 66, the oil in the reservoir being under pressure of air therein. The piston 11 is provided with annular grooves 13 accommodating sealing rings 14, one at either side of a recessed part of the piston which forms an annular oil sealing chamber 15 in conjunction with the surrounding wall of the cylinder 10 said annular oil sealing chamber being thereby mechanically sealed by one of the rings 14 from the air chamber 12.

Provided in the front end of the main piston 11 is a chamber 16 constituting an oil reservoir chamber which communicates with the annular oil sealing chamber 15 by radial ports 17 and with the oil chamber 61 by an oil supply passage 60 in the main piston 11.

Displaceably held in the outer end of the oil reservoir chamber 16 is an auxiliary piston 20 exposed to the opposing pressures in the oil chamber 61 and the air chamber 12 and adapted for movement responsively on difference arising in the opposing pressures of the oil and air said auxiliary piston 20 functioning as an unattached component of the main piston 11. The auxiliary piston is provided with sealing rings 21 sealing the reservoir chamber 16 from the air chamber 12 of the cylinder. Inward movement of the auxiliary piston is restrained by a coil spring 22.

The air chamber 12 of the cylinder is provided with an inlet 23 fitted with a non-return valve 24 through which air is pumped into said chamber.

The outer end of the piston rod 64 and the outer end 67 of the cylinder are provided respectively with eye lugs 68, 69 respectively for attachment of the device between two relatively moveable parts, such, for example, as between a vehicle chassis and axle box or like part associated with a road wheel, for damping shocks between the wheel and chassis. The device may also serve as a wheel-suspension means.

In operation when shock is applied to the main piston 11 or the cylinder 10, the main piston moves forwardly into the cylinder, and air in the air chamber 12 is compressed by the main and auxiliary pistons 11 and 20 with the result that pressure is set up in the air. Consequently, the auxiliary piston 20 is displaced inwardly of the reservoir chamber 16 and thereby transmits pressure of the air to the oil in the reservoir chamber 16, radial ports 17 and annular oil sealing chamber 15 and also in the passage 60, oil chamber 61 at the rear of the piston, pipe 66 and external reservoir 65, thereby setting up an opposing pressure in the oil in the annular oil sealing chamber 15 substantially equal to the pressure of the air in the air chamber 12 of the cylinder and setting up a pressure-balanced seal between the oil and the air which prevents compressed air escaping past the piston.

On the forward stroke of the main piston, relative movement of the main piston to the cylinder and of the parts with which the piston and cylinder are respectively associated, is damped by the air in the chamber 12 whilst on the return stroke of the piston 11 such relative movement is damped by the oil in the oil chamber 61 which is under opposing pressure of air in the closed reservoir 65.

Fig. 2 shows an alternative construction of shock absorber similar to that shown in Fig. 1 with the exception that the oil in the reservoir chamber 16, radial ports 17 and annular oil sealing chamber 15 is isolated from the oil in the oil chamber 61 at the rear of the piston, pipe 66 and external reservoir 65, oil being supplied to the reservoir chamber 16, ports 17 and annular oil sealing chamber 15 through a non-return valve 19, provided in the piston rod exteriorly of the cylinder 10, and supply passage 18 communicating the non-return valve 19 with the reservoir chamber 16. Eye lugs 68, 69 are provided as before for attachment of the device between two relatively movable members.

The operation of the device is substantially the same as that of the device of Fig. 1 except that, there being no communicating passage between the reservoir chamber 16 and the oil chamber 61, displacement of the auxiliary piston 20 by compressed air in the air chamber 12 is transmitted only to the oil in the reservoir chamber 16, ports 17 and annular oil sealing chamber 15 on the forward stroke of the main piston, oil being merely drawn into the oil chamber 61 from the external reservoir 65 during such forward stroke of the main piston. On the return stroke of the main piston, some of the oil is expelled from the oil chamber 61 to the external closed reservoir 65 to compress the air therein and thereby apply pressure to the oil in the chamber 61 to damp the return stroke of the main piston.

Fig. 3 shows a further alternative construction of shock absorber, in which the main piston 11 is spaced from the surrounding wall of the cylinder 10 by two interposed ring members 30 and 31 spaced apart to provide the interposed ring members 30 and 31 spaced apart to provide the annular oil sealing chamber 15, said ring members carrying sealing rings 32 and 33 contacting the piston and cylinder respectively and mechanically sealing the annular oil sealing chamber 15 from the air chamber 12 and from oil in the chamber 61 at the rear end of the cylinder behind the piston.

The ring members 30 and 31 are retained around the main piston by shoulders 34 and 35 respectively, the shoulder 34 being formed by a recessed part of the main piston, and the shoulder 35 being provided by a detachable end plate 36 secured to the main piston.

The annular chamber 15 is filled with oil pumped thereinto through the passages 41 from the passage 37 and non-return valve 38 provided in the piston 11 exteriorly of the cylinder and air is pumped into the cylinder chamber 12 through the inlet 23 and non-return valve 24.

The annular ring member 31 constitutes the displaceable member responsive to the opposing pressures of the oil and air and functions as an unattached component of the main piston in the form of an auxiliary annular piston, and a coiled spring 39 may be interposed between the two members 30 and 31.

The piston and cylinder are, as before, provided with eye lugs (not shown) for attachment of the device between relatively movable members.

The chamber 61 is filled with oil supplied thereto through piping 66 from an external reservoir (not shown) similar to that described with reference to Fig. 1

In operation, when shock is applied to the main piston or cylinder, the main piston moves forwardly into the cylinder, and air in the chamber 12 is compressed by the main and auxiliary pistons 11 and 31, with the result that pressure is set up in the air tending to overcome the pressure in the oil. Consequently, the auxiliary annular piston 31 is displaced inwardly into the annular chamber 15 and thereby transmits pressure of the air to the oil therein and in the passages 41 and 37, thereby setting up an opposing pressure in the oil in the annular chamber 15 substantially equal to the pressure of the air in the chamber 12 of the cylinder, and setting up a pressure-balanced seal between the oil and the air which prevents compressed air escaping past the piston.

The compression of the air in the chamber 12 during the forward stroke of the main piston has a damping effect upon the piston. The return stroke of the piston is, as previously described with reference to Fig. 1, damped by the oil in the chamber 61 at the rear of the piston.

Instead of the chamber 61 in Figs. 1, 2 and 3 being supplied with oil from the reservoir 65, it may be supplied with air in which case said reservoir would be an air reservoir. Alternatively, where air is used instead of oil in the chamber 61, said chamber may be open to atmosphere by providing a restricted air inlet, the arrangement being such that the air drawn into the chamber 61 at the rear of the piston 64 on the forward stroke thereof, would serve to damp recoil of the piston owing to exhaust of the air through the air inlet being restricted.

Further, instead of the piston 64 and cylinder 10 being provided with the eye lugs 68, other convenient means of anchorage to relatively movable members may be provided.

What I claim and desire to secure by Letters Patent is:

1. A shock absorbing unit comprising a cylinder, a piston in the cylinder dividing said cylinder into pressure fluid chambers at the front and rear of said piston, an annular oil sealing chamber between the piston and the surrounding wall of the cylinder, a pressure responsive member associated with and movable relative to the piston, one face of said member being exposed to the pressure fluid chamber in the cylinder at the front of the piston and an opposite face being exposed to the oil sealing chamber, a pressure fluid reservoir extraneous to the cylinder communicating with the pressure fluid chamber at the rear of the piston, a valve controlled pressure fluid inlet to the other of said chambers, an oil inlet in the piston communicating with the oil sealing chamber, and means on the piston and the cylinder permitting anchoring thereof to separate bodies for relative movement of said cylinder and piston.

2. A shock absorbing unit comprising a cylinder, a piston in the cylinder dividing said cylinder into pressure fluid chambers at the front and rear of said piston, an annular oil sealing chamber between the piston and the surrounding wall of the cylinder, a pressure responsive member slidably accommodated in the front end face of the piston axially thereof and having remote faces exposed on the one hand to the pressure fluid chamber at the front of the piston and on the other hand to the oil sealing chamber, a pressure fluid reservoir extraneous to the cylinder communicating with the pressure fluid chamber at the rear of the piston, a valve controlled pressure fluid inlet to the other of said chambers, an oil inlet in the piston communicating with the oil sealing chamber, and means on the piston and the cylinder permitting anchoring thereof to separate bodies for relative movement of said cylinder and piston.

3. A shock absorbing unit comprising a cylinder, a piston in the cylinder dividing said cylinder into an air chamber at the front and an oil chamber at the rear of said piston, an annular oil sealing chamber between the piston and the surrounding wall of the cylinder, a pressure responsive member slidably accommodated in the front end face of the piston axially thereof and having remote faces exposed on the one hand to the air chamber at the front of the piston and on the other hand to the oil sealing chamber, an oil reservoir extraneous to the cylinder and communicating with the oil chamber thereof, a valve controlled air inlet to the air chamber, an oil passage in the piston communicating with the oil chamber and the oil sealing chamber and means on the piston and the cylinder permitting anchoring thereof to separate bodies for relative movement of said cylinder and piston.

4. A shock absorbing unit comprising a cylinder, a piston in the cylinder dividing said cylinder into an air chamber at the front and an oil chamber at the rear of said piston, an annular oil sealing chamber between the piston and the surrounding wall of the cylinder, a pressure responsive annular member slidably accommodated around the piston between it and the cylinder and forming one end wall of the oil sealing chamber exposed to the air chamber, an annular member also around the piston and forming the other end wall of the oil sealing chamber exposed to the oil chamber of the cylinder, an oil reservoir extraneous to the cylinder and communicating with the oil chamber thereof, a valve controlled air inlet to the air chamber, an oil inlet in the piston communicating with the oil sealing chamber, and means on the piston and the cylinder permitting anchoring thereof to separate bodies for relative movement of said cylinder and piston.

5. A shock absorbing unit comprising a cylinder, a piston in the cylinder dividing said cylinder into an air chamber at the front of the piston and an oil chamber at the rear of said piston, an annular oil sealing chamber between the piston and the surrounding wall of the cylinder, sealing rings in the piston sealing the air chamber from the oil chamber of the cylinder and the oil sealing chamber, a pressure responsive member associated with and movable relative to the piston, one face of said member being exposed to the pressure fluid chamber in the cylinder at the front of the piston and an opposite face being exposed to the oil sealing chamber, a pressure fluid reservoir extraneous to the cylinder communicating with the pressure fluid chamber at the rear of the piston, a valve controlled pressure fluid inlet to the other of said chambers, an oil inlet in the piston communicating with the oil sealing chamber, and means on the piston and the cylinder permitting anchoring thereof to separate bodies for relative movement of said cylinder and piston.

ARTHUR PERCY FITZ JOHN.

References Cited in the file of this patent

UNITED STATES PATENTS

| Number | Name | Date |
| --- | --- | --- |
| 1,220,630 | Hayes | Mar. 27, 1917 |
| 1,680,890 | Laugaudin | Aug. 14, 1928 |
| 1,984,144 | Laugaudin | Dec. 11, 1934 |
| 2,053,053 | Swalm | Sept. 1, 1936 |
| 2,604,320 | Hoare | July 22, 1952 |

FOREIGN PATENTS

| Number | Country | Date |
| --- | --- | --- |
| 655,224 | Germany | Jan. 11, 1938 |